(No Model.) 3 Sheets—Sheet 1.
F. T. & G. E. MARCHAND.
DISTANCE INSTRUMENT.
No. 563,196. Patented June 30, 1896.
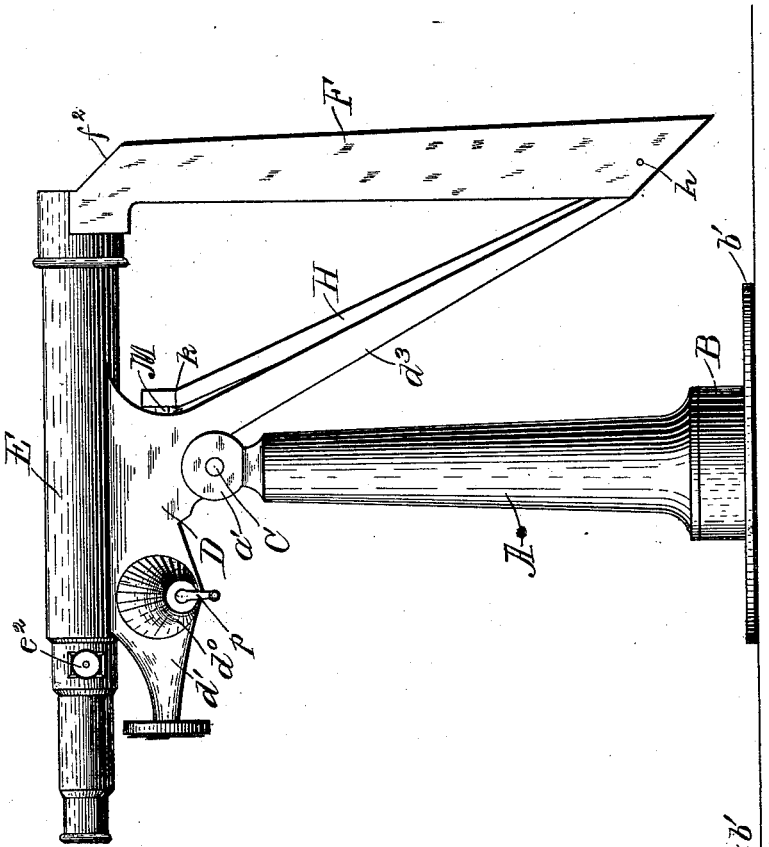
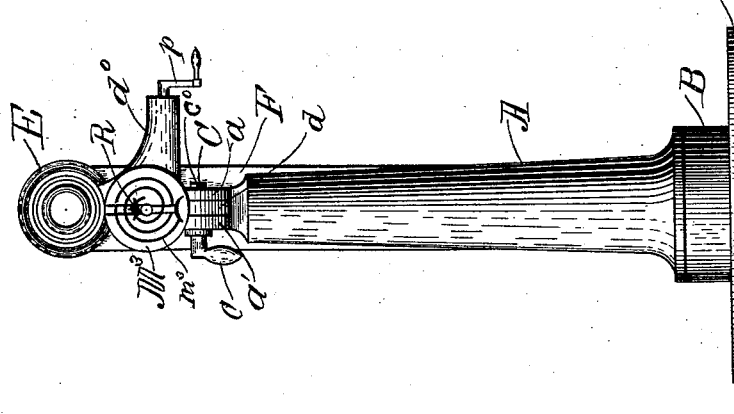
Witnesses
John H. Holt
J. Stephen Ginata
Inventors
F. T. Marchand,
G. E. Marchand,
By Whitman & Wilkinson
Attorneys (No Model.) 3 Sheets—Sheet 2.

F. T. & G. E. MARCHAND.
DISTANCE INSTRUMENT.

No. 563,196. Patented June 30, 1896.

Witnesses
John N. Holt
J. Stephen Ginsta

Inventors
F. T. Marchand,
G. E. Marchand,
by Whitman & Wilkinson
Attorneys.

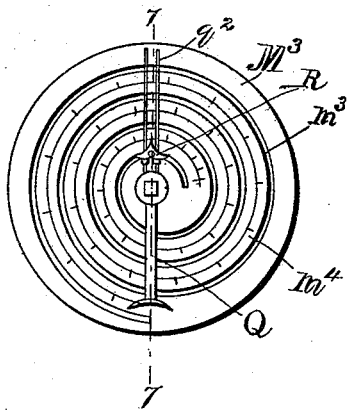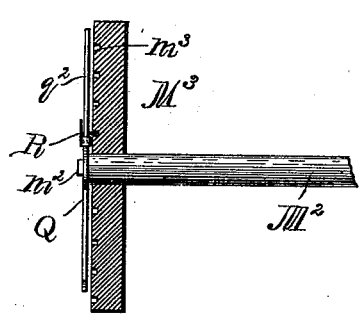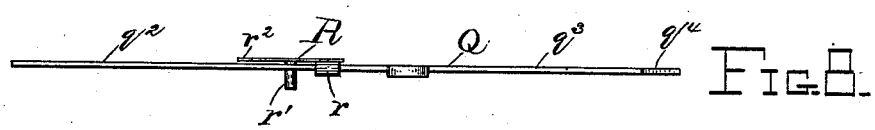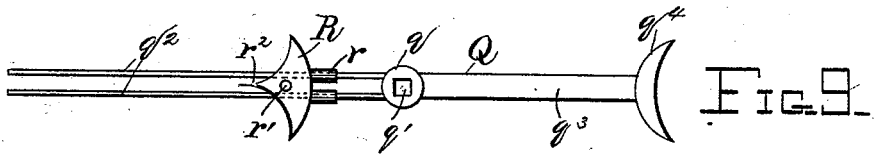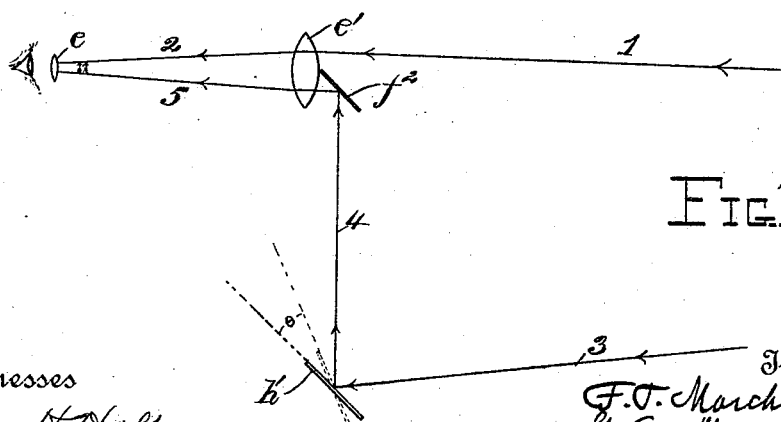

UNITED STATES PATENT OFFICE.

FRANCIS T. MARCHAND AND GEORGE E. MARCHAND, OF ANNAPOLIS, MARYLAND.

DISTANCE INSTRUMENT.

SPECIFICATION forming part of Letters Patent No. 563,196, dated June 30, 1896.

Application filed March 6, 1896. Serial No. 582,120. (No model.)

*To all whom it may concern:*

Be it known that we, FRANCIS T. MARCHAND and GEORGE E. MARCHAND, citizens of the United States, residing at Annapolis, in the county of Anne Arundel and State of Maryland, have invented certain new and useful Improvements in Distance Instruments; and we do hereby declare the following to be a full, clear, and exact description of the invention, such as will enable others skilled in the art to which it appertains to make and use the same.

Our invention relates to improvements in distance instruments or instruments for measuring the distance between the point of observation and any object distant therefrom at a single operation.

The instrument is especially adapted for use as a range-finder or distance-measuring instrument on board ships or boats; and it is also especially adapted for use in surveying small streams or narrow gorges or the like where the observation is to be taken from one side only of the stream or gorge and where it is impracticable or inconvenient to carry out any satisfactory system of triangulation.

The said invention consists of certain novel features hereinafter described and claimed.

Reference is had to the accompanying drawings, in which the same parts are indicated by the same letters throughout the several views.

Figure 3:
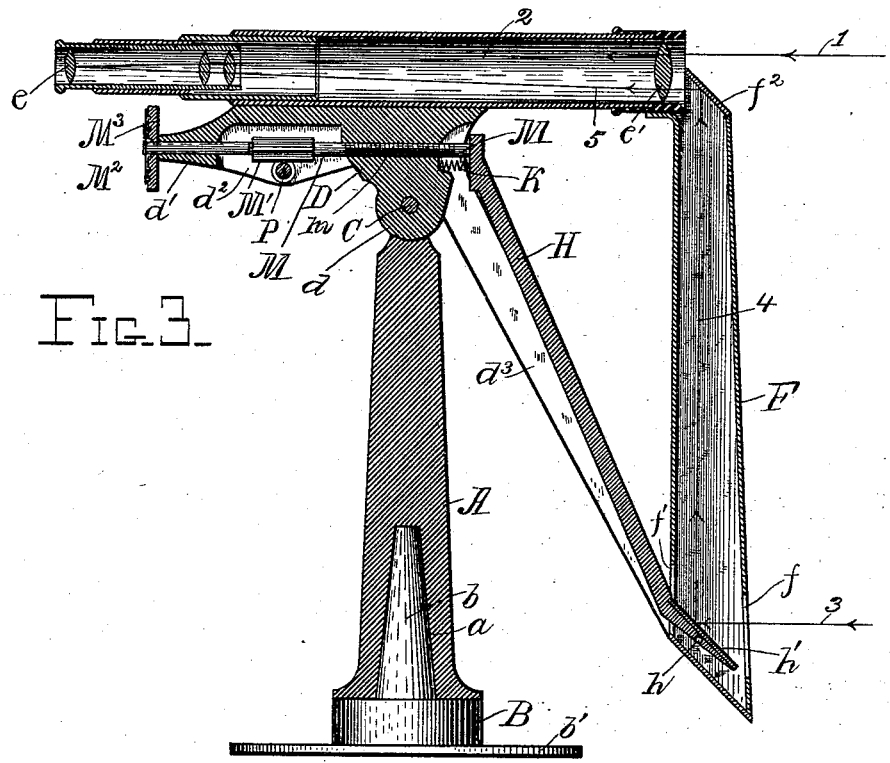
Figures 4, 5:
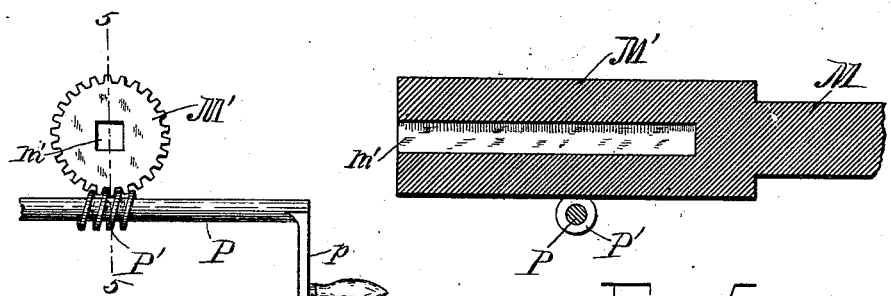

Figure 1 represents a rear view of our improved distance instrument. Fig. 2 represents a side elevation of the same. Fig. 3 represents a central vertical section through the instrument and the base thereof. Fig. 4 is a detail view of the adjusting-worm and milled head of the micrometer-screw. Fig. 5 is a central longitudinal section along the line 5 5 of Fig. 4. Fig. 6 is a detail view from the rear of the dial, showing the conchoidal groove therein. Fig. 7 represents a section along the line 7 7 of Fig. 6, the index-shaft and dial hand or pointer being shown in elevation. Fig. 8 represents a side elevation of the dial-hand with sliding pointer thereon. Fig. 9 represents a plan view of the device shown in Fig. 8, and Fig. 10 is a diagrammatical view showing the paths of the reflected and incident rays.

A represents the standard, which is revolubly mounted on the pedestal B, which may be accomplished in a great variety of ways, one of which we have indicated by having this standard chambered, as at $a$, to receive the conical spindle $b$, while the pedestal B is provided with an enlarged flange $b'$, by means of which the said pedestal may be secured to the deck or platform or other foundation from which the instrument is to be used.

The instrument may be be mounted on an ordinary tripod, such as used by surveyors, or upon any other suitable pedestal or support. The top of the pedestal shown in the drawings is provided with bifurcated bearings $a'$, adapted to receive the heel $d$ of the base-piece D of the telescope, which heel is journaled on the pin C, provided with screw-threads $c^0$ to engage screw-threads in one of the said bearings $a'$, and with the handle $c$ to turn the said pin, whereby the instrument may be clamped at any desired position. This base-piece D is provided with a rearwardly-extending arm $d'$, which has a laterally-projecting lug $d^0$, while this arm $d'$ is chambered out, as at $d^2$, and the front end of this base-piece D terminates in two downwardly-projecting arms $d^3$.

The telescope E is rigidly attached to this base-piece D in any convenient way, and is provided with an eyeglass $e$ and an object-glass $e'$, the former of which may be focused by means of the adjusting-screw $e^2$ or in any other convenient way.

Connected to the front end of the telescope and extending down and made fast to said arms $d^3$ is a box or tube F, having the openings $f$ and $f'$ near the lower end thereof and a mirror $f^2$ at the upper end thereof, which mirror is inclined at such an angle that a ray of light reflected upward through the axis of the tube or box F will be reflected by the said mirror to the center of the eyeglass $e$, as shown in Fig. 3. The top of this mirror $f^2$ may project up into the axis of the telescope, as shown in Fig. 3, or may be continued up so as to cover the whole of the face of the eyeglass, but having all the upper portion of the said mirror above the axis of the telescope made clear, the mirror being silvered only below the axis of the telescope.

H represents a bar, which is pivoted, as at $h$, behind the opening $f$ in the box or tube F, and carries a mirror $h'$, which in the zero position, when the distance to be observed is infinite, should be parallel to the instrument $f^2$. The distance measured is really a function of the angle through which the mirror $h'$ is turned, as will be hereinafter more fully described. The upper end of this pivoted bar H is normally drawn back toward the adjusting-screw M by means of a spring K of any suitable form or strength. The bar is moved forward against the action of this spring by means of the micrometer-screw M, which is screw-threaded, as at $m$, and which is engaged in the corresponding female screw-thread in the base-piece D.

The spring K draws the bar backward when the micrometer-screw is turned backward, and thus at all times a firm connection between the end of the micrometer-screw and the upper portion of the bar H is maintained.

The micrometer-screw M is provided with a milled head M', having a central angular chamber $m'$, as shown most clearly in Figs. 4 and 5.

The worm P', mounted on the worm-shaft P and operated by the hand-crank $p$, gives an extremely-fine adjustment to the said micrometer-screw. By having said screw engage the base-plate D through many turns any appreciable irregularities as to wear of said screw are avoided.

The index-shaft $M^2$ is tenoned at its inner end in this angular chamber $m'$ and projects through the dial-plate $M^3$, the said shaft turning freely therein.

The dial-plate $M^3$ is provided with a spiral or conchoidal groove $m^3$ therein, separated by the ribs $m^4$, which ribs are graduated either to the angle through which shaft $M^2$ is turned or to the distance observed, but preferably to the distance observed.

The shaft $M^2$ is provided with an angular portion $m^2$, over which the dial-hand Q fits snugly, as shown in Figs. 6 and 7. This dial-hand is provided with two stout wire rods $q^2$, adapted to receive the sleeves $r$ of the index or pointer R, which is provided with a point $r^2$ and with a stud $r'$, adapted to engage in the said spiral groove $m^3$. The portion $q$ of the hand Q is provided with an angular opening to fit over the end of the shaft $M^2$, while the opposite end $q^3$ of the hand is provided with a counterpoise-weight $q^4$, but these parts $q^3$ and $q^4$ are not necessary and may be omitted if desired.

It will be seen from an inspection of Figs. 6 to 9 that as the shaft $M^2$ is revolved, the pointer R will be moved around and at the same time moved outward or inward following the spiral curve $m^3$. By having this curve made spirally, as shown, an angle greater than three hundred and sixty degrees may be readily observed, whereas were this groove simply circular, in case the angle should be greater than three hundred and sixty degrees, additional computations would be required.

The mirror $f^2$ should preferably be set at approximately forty-five degrees to the axis of the telescope. In adjusting the instrument, which should preferably be done at the manufacturer's or when it is set up, the scale should be at zero-angle for infinite distance, when the rays of light from the object at an infinite distance, such, for instance, as a star, coming along the path 1 2 and the path 3, 4, and 5, coincide.

In case the rays do not coincide, the mirror $h'$ should be moved about the pivot $h$ until these rays do coincide, when the instrument will be in adjustment.

After the instrument is adjusted, the distance of objects not too far off can be observed by bringing the double images seen directly and reflected together until they are exactly superimposed the one on the other, when if the mirror $f^2$ be set at an angle of forty-five degrees to the axis of the telescope, the distance can be ascertained by the formula: distance = length between mirror × cotangent angle subtended by this length at the object observed, or $\delta = \delta' \cot. 2\theta$, where $\theta =$ the angle the pivoted mirror is turned through, $\delta =$ the diistance to be ascertained, and $\delta' =$ the distance between the mirrors or the base-line of measurement.

The dial $M^3$ may be graduated experimentally by observing known distances, or any intelligent surveyor could make a table of graduations from the foregoing formula, remembering that the angle $\theta$, through which the mirror $h'$ is turned, is one-half the parallax subtended at the distant object by the distance between the reflecting-surfaces of the mirrors $h'$ and $f^2$.

It will be obvious from the foregoing that the greater the distance observed the less will be the angle through which this mirror $h'$ is turned, and consequently the less will be the angular motion of the pointer R, while when the distance observed becomes small the angular motion of the pointer R will become comparatively great. Therefore it will be seen that this instrument is far more accurate when observing comparatively short distances than when the distances are comparatively great, which, however, is a common quality of all instruments of this character. This fact naturally follows from the recognized fact that the observation is in reality a measurement of triangulation in which the base lies in the instrument itself, and the two angles adjoining the base are measured by the instrument.

The probable errors due to having an insufficient base are in a large measure obviated by having the telescope of sufficient size and the various parts accurately adjusted.

It will be obvious that, other things being equal, the accuracy of the instrument will vary directly with the distance between the mirrors, and this distance may be long or short in different instruments, according to prevailing conditions. Thus on board ship a comparatively long base may be secured, while for boat use or for purposes of land-surveying the instrument would necessarily be made more compact. While we have shown the tube F as vertically arranged, it will be obvious that the instrument would operate quite as well if this tube or box be horizontally disposed or inclined at an angle. Moreover, this tube or box may be omitted, and the pivoted mirror may be held simply between the arms $h^3$. The only condition requisite is that the axis of the tube, or the path of the ray of light between the mirrors, should be at right angles or at some fixed and known angle to the axis of the telescope.

Instead of a single telescope binocular glasses may be used, if desired, in which case the only material change required would be to widen the mirrors somewhat.

It will be obvious that other means for regulating the parallelism of the mirrors or the angle between the mirrors than that we have shown may be adopted, if desired, and that a great many other modifications of the herein-described instrument might be made which could be used without departing from the spirit of our invention.

Having thus described our invention, what we claim, and desire to secure by Letters Patent of the United States, is—

1. In a distance instrument, the combination with a telescope, a base-piece supporting the same, and means for revolubly supporting said base-piece, of a mirror placed in front of and at an angle to the object-glass of the telescope and having its silvered surface partly overlapping the said object-glass, a pivoted mirror mounted at a fixed distance from the first mirror and approximately parallel thereto, a box or tube inclosing the path of a ray of light reflected from the pivoted to the fixed mirror, an arm attached to said second mirror, a micrometer-screw mounted in the aforesaid base adapted to move said arm through the desired angle against the action of said spring, a sleeve carried by said micrometer, a shaft geared to the said sleeve, a hand rotated by said micrometer-screw, a sliding pointer carried by said hand and a dial provided with a spiral groove adapted to engage said pointer, substantially as described.

2. In a distance instrument, the combination with a telescope, of a base-piece supporting the same, means for revolving the telescope in both a horizontal and vertical plane and supporting the said base-piece, an arm extending forward at an angle to the plane of the telescope and forming a part of the said base-piece, a tube supported by the said arm and partially inclosing the end of the telescope, a fixed mirror mounted at the upper end of the said tube and placed before and at an angle to the object-glass of the telescope, a pivoted mirror mounted in the aforesaid tube at a fixed distance from the first mirror and approximately parallel thereto, an arm attached to the said second mirror, a micrometer-screw adapted to give angular movement to the said arm, a milled sleeve on said micrometer-screw, a worm engaging said milled sleeve, a hand rotated by said micrometer-screw, a sliding pointer carried by said hand and a dial provided with a spiral groove and adapted to engage said sliding pointer, substantially as described.

3. In a distance instrument, the combination with a telescope, a base-piece supporting the same, and means for revolubly supporting said base-piece, of a mirror placed in front of and at an angle to the object-glass of the telescope, and having its silvered surface partly overlapping the said object-glass, a pivoted mirror mounted at a fixed distance from the first mirror and approximately parallel thereto, an arm attached to said second mirror, a micrometer-screw adapted to move said arm and provided with a milled head, a worm engaging said milled head, a hand rotating with said micrometer-screw, a sliding pointer carried by said hand, and a dial-plate provided with a spiral groove adapted to engage said sliding pointer, substantially as described.

4. In a distance instrument, the combination with a telescope, a base-piece supporting the same, and means for supporting said base-piece, of a fixed mirror placed before and at an angle of about forty-five degrees to the object-glass of the telescope, and partly overlapping the said object-glass, a pivoted mirror mounted at a fixed distance from the first mirror, and approximately parallel thereto, a micrometer-screw for rotating said second mirror through a small angle about its pivot, and provided with a milled head, a worm engaging said milled head, a hand with a sliding pointer thereon rotated by said micrometer-screw, and a dial provided with a spiral groove engaging said pointer, substantially as described.

5. In a distance instrument, the combination with a telescope, a base-piece supporting the same, and means for revolubly supporting said base-piece, of a mirror placed in front of and at an angle to the object-glass of the telescope, and having its silvered surface partly overlapping the said object-glass, a pivoted mirror mounted at a fixed distance from the first mirror and approximately parallel thereto, an arm attached to said second mirror, a spring normally holding said arm in a fixed position, a micrometer-screw adapted to move said arm against the action of said spring, and provided with a milled head, a worm engaging said milled head, a hand rotating with said micrometer-screw, a sliding pointer carried by said hand, and a dial-plate provided with a spiral groove adapted to engage said sliding pointer, substantially as described.

In testimony whereof we affix our signatures in presence of two witnesses.

FRANCIS T. MARCHAND.
GEORGE E. MARCHAND.

Witnesses:
ELIZABETH P. MARCHAND,
MARGARET D. MARCHAND.